United States Patent [19]
Sinitsyn et al.

[11] Patent Number: 5,622,133
[45] Date of Patent: Apr. 22, 1997

[54] TRANSPORT FACILITY WITH DYNAMIC AIR CUSHION

[75] Inventors: Dmitry N. Sinitsyn; Vladislav G. Alyamovsky; Anatoly A. Antonov; Genrich L. Radovitsky; Vladimir V. Tomilin; Leonid O. Litinsky; Vladimir V. Shmelev, all of N. Novgorod, Russian Federation

[73] Assignee: Seagull Decor Co., Ltd., Taipei, Taiwan

[21] Appl. No.: 308,940

[22] Filed: Sep. 20, 1994

[51] Int. Cl.$^6$ ........................................... B63B 1/00
[52] U.S. Cl. .................... 114/272; 114/283; 244/66; 244/100 A; 244/105
[58] Field of Search ................... 244/106, 105, 244/56, 66, 100 A; 114/272, 273, 283, 67 A

[56] References Cited

U.S. PATENT DOCUMENTS

| | | | |
|---|---|---|---|
| 1,061,434 | 5/1913 | Willows | 244/66 |
| 3,190,587 | 6/1965 | Fries | 244/106 |
| 3,903,832 | 9/1975 | Ishida | 114/273 |
| 4,068,606 | 1/1978 | Veldhuizen | 114/67 A |
| 4,365,578 | 12/1982 | Schellhaas | 114/272 |
| 4,712,630 | 12/1987 | Blum | 114/283 |

FOREIGN PATENT DOCUMENTS 2120990  12/1963  United Kingdom.

*Primary Examiner*—Sherman Basinger
*Attorney, Agent, or Firm*—Ostrolenk, Faber, Gerb & Soffen, LLP

[57] ABSTRACT

The transport facility with dynamic air cushion, which has a hull, a wing with flaps, and a tail empennage. A power system turns propellers connected with a transmission. The propellers are installed in front of the wing. Pneumatic cylinders are located at the ends of the wings parallel to the fore-and-aft axis of the transport facility. The engine is installed inside the hull and the propellers, used for a power-augmented ram technique, are driven by the transmission system connected to the engine. Turning pylons connected to the propeller bosses change the propellers rotation plane within the angle ($\alpha=0°-80°$). The pylons are installed on the hull. The tail empennage consists of two fins and a stabilizer installed on the fins. A retractable elastic pneumatic ski is installed at the lower bow surface of the hull. The lower surface of the ski, in a release position, is located below the lower surface of the side pneumatic cylinders. In a retracted position the pneumatic ski shell is retained close against the hull. A propeller guard is installed in the bow part and connects the bow ends of the hull and the wing pylons. Shock-mounted wheel supports that can be retracted into recesses on the lower surface of the wings are installed on the right and left sides next to the mass center under the wings.

8 Claims, 4 Drawing Sheets

TRANSPORT FACILITY WITH DYNAMIC AIR CUSHION

BACKGROUND OF THE INVENTION

1. Field of the Invention

The present invention relates to the field of shipbuilding and, in particular, to a transport facility with a dynamic air cushion.

The transport facility according to the present invention can be used most successfully for high-speed passenger and freight transportation within coastal marine water areas, on rivers and water storage reservoirs, including also in winter time when rivers and lakes are covered with ice, as well as under the conditions of flat-country areas of land practically in any season of the year.

2. Description of the Prior Art

At the present time, in the field of water transport there is a problem of increasing the speed of vessels. The problem is a crucial one for the growth of their efficiency in carrying out passenger or freight transportation operations.

The solution of the above-mentioned problem has led to the development of transport facilities with a dynamic air cushion. The basic characteristic feature of a vessel with a "dynamic" air cushion consists in that it is provided with an air wing having a small aspect ratio and, as a rule, a rectangular configuration in the plan view, and with skegs mounted along the end ribs of the wing. Under the term of a "dynamic" air cushion is implied an air cushion created by a moving flow of air when it is confined within a dome-shaped arch defined by the wing with its trailing-edge flaps lowered down, by the skegs and by the supporting surface (i.e., the water space or ground surface).

The moving flow is developed by an air supercharger mounted in front of the wing and by the incident flow. The differential pressure within the air cushion creates a lifting force which is equal to or exceeds the weight of the vessel even when it is moving at its minimum speed.

As the speed of the transport facility increases, the prevailing role in the formation of the dynamic air cushion goes over to the incident air flow.

The vessels with the dynamic air cushion possess a number of important performance capabilities which improve substantially their efficiency.

The vessel can be operated within shallow water areas, and at those places where the traffic is intensive it allows use of routes passing outside the ships' way without the interference with the movement of the other vessels. The vessel is able to come out of water to a flat-gradient, relatively-even shore or bank for boarding or landing the passengers and for carrying out maintenance—a factor which considerably simplifies its operation, etc.

This high-speed water-based transport facility can fill the gap in such needs of the society not met as yet, such as fast taxi communication between inhabited localities spaced from each other along the coastline, expeditions, water salvaging service, guarding the water boundaries against trespassers, fishery inspection service, etc.

A transport facility is known in the prior art to have an air cushion, such as, for instance, an air cushion ship (see GB Patent No. 2 120 990).

The prior art ship comprises two hulls which have the longitudinal axes thereof parallel to one another. The above-mentioned hulls are interconnected by means of a central wing provided with trailing-edge flaps. Underneath, in between the hulls is a space open on the side of the front edge of the wing.

In order to improve the aerodynamic quality of this ship, and to increase the ratio between the lifting force and the ship's drag, use is made of side wings provided with trailing-edge flaps. Each side wing is installed on the hull closer to the stern than the central wing. In order to ensure stability of the ship when it is in its cruising mode, a tail empennage is arranged to be disposed within the stern portion thereof, the tail empennage consisting of two vertical keels and a horizontal stabilizer connected with the latter. Each of the keels is rigidly connected with one of the hulls. In front of the bow edge of the central wing, a beam is arranged to be disposed which is joined with the hulls and carries two turbo-propeller engines which are capable of being turned angularly relative to the axis perpendicular to the center line plane of the transport facility—a factor which allows one to vary the direction of the propulsion vector of the engines in the vertical plane coinciding with the center line plane of the ship. The bottom of each hull is made rigid, with sharp keeled frames.

When this prior art ship is moving at low speeds, the gas flow created by the turbo-propeller engines is directed into the space open on the side of the front edge of the wing limited from beneath by the surface of water, from above and from behind by the central wings with its trailing-edge flaps lowered, and from the lateral sides by the hulls. Within the above-mentioned space, braking of the gas flow takes place which is accompanied by the growth of pressure upon the lower surface of the central wing so that a lifting force is thus developed. The horizontal constituent of the propulsion vector ensures the translational movement of the ship. The lifting force reduces the draught of the ship. This leads to a reduction in its hydrodynamic drag and to an increase in the speed of the translational movement of the ship.

As soon as the speed of the translational movement of the ship reaches the magnitude at which the lifting force becomes equal to the weight of the ship, its take-off from the water surface takes place. After this, the trailing-edge flaps are returned to their initial positions, thus ensuring the horizontal direction of the propulsion vector for the mode of cruising.

This design embodiment of the ship described above leads to an increase in the relative weight of the construction and to its higher cost because of a large weight of the beam together with the engines arranged to be disposed on it and because of large weight and great power of the drive used for varying the direction of the propulsion vector.

The rigid design of the bottom of each hull of the ship deprives it of an amphibious property, i.e., the capability of this ship to go out of water and move over the land.

A transport facility is known in the prior art to have a dynamic air cushion (See "Shipbuilding" Journal No. 1, January of 1991, "Soodostroeniye" Publishing House, Article "New Generation of Winged Ships" by V. V. Sokolov, Leningrad).

The above-mentioned transport facility comprises a hull which is provided with a wing mounted within the middle portion thereof and having trailing-edge flaps for developing a lifting force. An empennage is disposed within the stern portion thereof to ensure that the transport facility is stable. The tail empennage is of a single-keel type and has a stabilizer fastened to the end rib of the keel. At either end cross-section of the wing a skeg is installed, and the latter is joined rigidly with the wing and made resilient on the side facing the grounds. Elastic pneumatic balloons are mounted stationarily to the skegs and to the hull on the side thereof facing the ground.

In order to ensure propulsion, this transport facility is provided with two air propellers arranged to be disposed symmetrically with respect to the center line plane of the transport facility in front of the bow edge of the wing. Each propeller is installed within a ring attached to the hull. In order to change the direction of the propulsion vector in the vertical plane which is parallel with the center line plane, either of the rings is provided with flaps installed within the zone of the rear edge thereof so that they can be turned angularly relative to their respective axes which are perpendicular to the center line plane. Each of the supports for the shafts rotating the propellers is fastened rigidly to a beam formed by the rings and a connecting member joined with the latter and attached to the hull within the zone of its bow portion. The shafts for rotating the propellers are connected be means of a mechanical transmission to the engines arranged to be disposed on the upper surface of the wing symmetrically relative to the center line plane of the transport facility.

The transport facility described above has an elevated fuel consumption by the engines because of the necessity to increase the propulsion developed by the propellers due to an increase in the aerodynamic drag caused by blowing the flaps and rings over with the air flow.

Further, the presence of the rings, which have the area thereof influenced by external disturbance, such as, for instance, gusts of wind, reduces the longitudinal and coursekeeping stability of the transport facility, to retain which it is required to develop the surface of the tail empennage, but this will lead to an increase in the weight of the transport facility.

This prior art transport facility features reduced values of the specific propulsion of the propellers which is defined as the ratio of the propulsion to the power developed by the engines, because of the limitation imposed upon the diameter of the propeller due to the vicinity of the water surface and due to the stationary position of the propeller. The presence of the two-engines on the above-mentioned transport facility reduces the safety of its operation at the cruising speed since if one of the engines fails unexpectedly, an unbalanced torque appears relative to the vertical axis as a result of the propulsion force developed by the working engine—a factor which will lead to an abrupt change in the course of the transport facility.

In addition, the wing of this prior art transport facility has an elevated coefficient of aerodynamic drag and a reduced coefficient of lifting force because the engines are located on it. These engines have a shortcoming of reducing the reliability of operation of the ship when the sea is running high because they are flooded with water. The presence of the pneumatic balloon mounted to the hull increases both the aerodynamic drag and the hydrodynamic drag of the transport facility and reduces the efficient area of the lower surface of the wing on which the lifting force is developed.

The above-mentioned transport facility has a reduced operational reliability because of a possible failure of its propellers in case of running it into objects which it may encounter along the path of its motion.

This prior art transport facility is difficult to be hauled over the land with its engines in nonoperating condition.

Accordingly, there exists a need for developing a transport facility with a dynamic air cushion, in which, due to an appropriate variation in the design of the beam and to a peculiar disposition of the engine with the transmission, there would be ensured an increase in its economical efficiency, weight efficiency factor, and an improvement in the specific propulsion of the propellers.

SUMMARY OF THE INVENTION

The present invention overcomes the deficiencies of the prior art by providing a transport facility that includes a hull which is provided with a wing mounted within the middle portion thereof and having trailing-edge flaps for developing a lifting force. An empennage is disposed within the stern portion thereof to ensure that the transport facility is stable. Two skegs for enclosing an air cushion, either of which is installed at an end cross-section of the wing, are joined rigidly with the latter and made resilient on the side facing the ground. Means for developing propulsion, preferably made in the form of two air propellers, are disposed symmetrically with respect to the center line plane of the transport facility in front of the bow edge of the wing. The supports of the shafts used for rotating the propellers are fastened rigidly to a beam connected with the hull within the zone of the bow portion thereof. An engine is connected by means of a mechanical transmission to the shafts rotating the propellers.

According to the invention, the beam is hollow and is connected pivotally with the hull and provided with means for varying the angular position thereof relative to its longitudinal axis, which is perpendicular to the center line plane of the transport facility. The plane of the disk that either air propeller forms with respect to an initial position, corresponding to positioning the axis of rotation of each propeller in the horizontal plane at an angle $\alpha$ lying in the vertical plane, can be varied within the range from about 80° to 0° in the counter-clock-wise direction if viewed, from the left-hand side of the transport facility, so that in the angular position of the beam equal to zero the axis of rotation of either propeller lies in the horizontal plane. The engine is disposed inside the hull and located in front of the center of mass of the transport facility in the direction of the bow portion (bow) of the hull. The mechanical transmission is arranged to be disposed inside the hull and in the cavity of the beam.

Such a design embodiment of the transport facility ensures an improvement in its economical efficiency due to a reduction in its aerodynamic drag and to an increase in the bearing capacity of the wing, as well as a reduction in the mass of design as a result of arranging the engine inside the hull of the transport facility and arranging the mechanical transmission inside the hull and in the cavity of the beam.

In the transport facility, according to the invention, an increase in the specific propulsion of either propeller has been attained by way of increasing its diameter since the end cross-sections of their blades are prevented from brushing the surface of water. A change in the angular position of the beam makes it possible to remove the end cross-sections of the blades of the propellers from the crests of the waves.

The above-mentioned range of 80° to 0° within which the angle $\alpha$ may vary, and namely, the variation of the position taken by the plane of the disk of the air propeller, is related with a variation in the speed developed by the transport facility starting from zero and up to the maximum speed in the mode of acceleration.

In the angular position of the beam equal to zero, the axis of rotation of each propeller lies in the horizontal plane, and in this case the propulsion developed by the propellers at the maximum horizontal constituent, whereas the transport facility is running at its maximum speed.

In a further embodiment, the hull, on the side thereof facing the ground, would be provided with a self-collapsible, inflatable device stretching from the bow portion of the hull up to approximately the middle portion thereof and having, when in its unfolded deposition, such cross-sections in the plane of the frames which increase their area in the vertical direction and which, in the direction from the bow portion to the middle portion of the hull, form a section which has the surface thereof arranged to be disposed below the horizontal plane that is tangent to the lower surfaces of the skegs.

This device allows the transport facility to operate within a water area where the sea is running high. In its unfolded, inflated position, the above-mentioned device creates an additional volume which reduces the draught and increases the trim by the stern of the transport facility in order to move the end cross-sections of the blades of the propellers away from the crests of waves. The collapsed position of the device reduces the hydrodynamic drag of the transport facility.

The device described above improves the maneuverability of the transport facility on the land since, when inflated, it has a section that is located below the horizontal plane which is tangent to the lower surfaces of the skegs. The surface of the above-mentioned section is a support of the transport facility relative to which a turn of the transport facility takes place under the influence exerted by the difference of moments emerging from unequal propulsion forces developed by the propellers of the starboard and of the port side and induced by the driver. In addition to this, the above-mentioned device, when it is in its unfolded, inflated position, ensures efficient braking of the transport facility on the water due to an increase in the hydrodynamic drag, and on the land due to an increase in the friction force between the surface of the ground and the surface of the transport facility.

It is necessary in the transport facility to provide for a means that protects the propeller against damage, the means being constituted by two beams either of which is rigidly connected with the bow portions of the hull and of the skeg.

Such a design embodiment of the transport facility improves its operational reliability since a failure of its air propellers is prevented when it runs into objects met along the path of its motion.

The wing, on the side thereof facing the ground, can be provided with wheeled supports mounted thereto in the immediate vicinity to the hull on its starboard and on its port side, the wheeled supports being arranged to be disposed behind the center of the mass of the transport facility in the direction towards the stern thereof, whereas the axles of these wheeled supports are connected kinematically with the device so that they can be extended outside the wing and folded to become housed inside the wing.

Use made of the wheeled supports facilitates the transportation of this transport facility over the land, with its engine not running.

Other features and advantages of the present invention will become apparent from the following description of the invention which refers to the accompanying drawings.

DETAILED DESCRIPTION OF THE PREFERRED EMBODIMENTS

Figure 1:
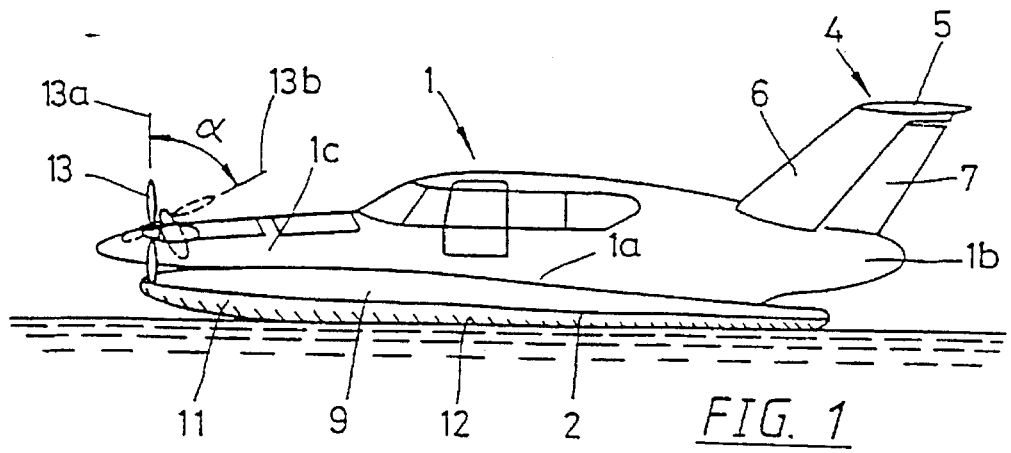
FIG. 1 illustrates schematically the transport facility, according to the present invention, in its side view.

The transport facility with a dynamic air cushion, according to the present invention, comprises a hull 1 (shown in FIG. 1) which is provided with a wing 2 having a small aspect ratio, for example, 0.8, mounted within a middle portion 1a and a stern portion 1b (shown in FIG. 2) of the hull. The wing is provided with trailing-edge flaps 3 for developing a lifting force. An empennage 4 is arrange to be disposed within the stern portion 1b of the hull 1 to ensure that the transport facility is stable. The empennage 4 is formed by a horizontal stabilizer 5 for ensuring longitudinal stability and by two inclined keels 6 for ensuring course stability of the transport facility, which are rigidly connected with the stabilizer 5 and the stern portion 1b of the hull 1. Two direction rudders 7 (shown in FIG. 1) are provided for steering as to the course, each of which is pivotally connected with the keel 6.

Figure 3:
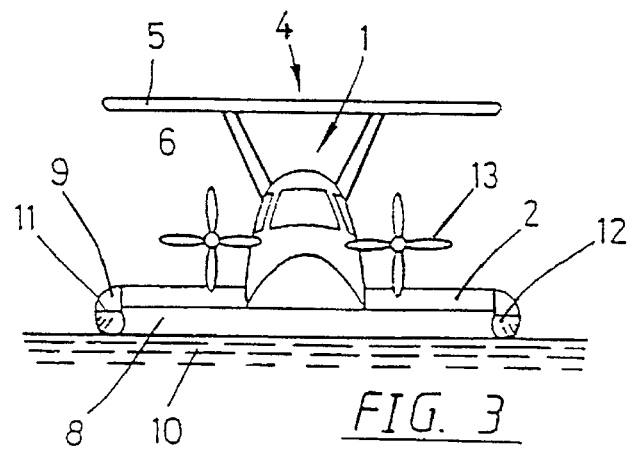
FIG. 3 is the front view of the present invention as shown in FIG. 1.

For safeguarding an air cushion 8 (shown in FIG. 3) formed under the transport facility, two skegs 9 are provided either of which is installed at an end cross-section of the wing 2, is joined rigidly with the latter and is provided on the side facing a supporting surface 10, for instance, the surface of the water space, with a pneumatic balloon 11 connected with an air supercharger (not shown). Each balloon has planing steps 12 (shown in FIG. 1) on the external surface thereof to prevent the emergence of rarefaction on the surfaces of the pneumatic balloons 11 during the hydroplaning of the transport facility. The pneumatic balloons 11 are made of an elastic material and serve for the movement of the transport facility on the land.

In the transport facility, according to the present invention, use is made of two air propellers 13 as a means for developing propulsion, which are arranged to be disposed symmetrically with respect to the center line plane of the transport facility in front of a bow edge 2a (shown in FIG. 2) of the wing 2.

The supports (not shown) of the shafts that rotate propellers 13 are fastened rigidly to a beam 14. The latter is made hollow, and is pivotally connected with respect to the hull 1 within the zone of the bow portion 1c thereof. A means (not shown) is provided for varying the angular position of the beam relative to its longitudinal axis 15, which is perpendicular to the center line plane of the transport facility.

Figure 2:
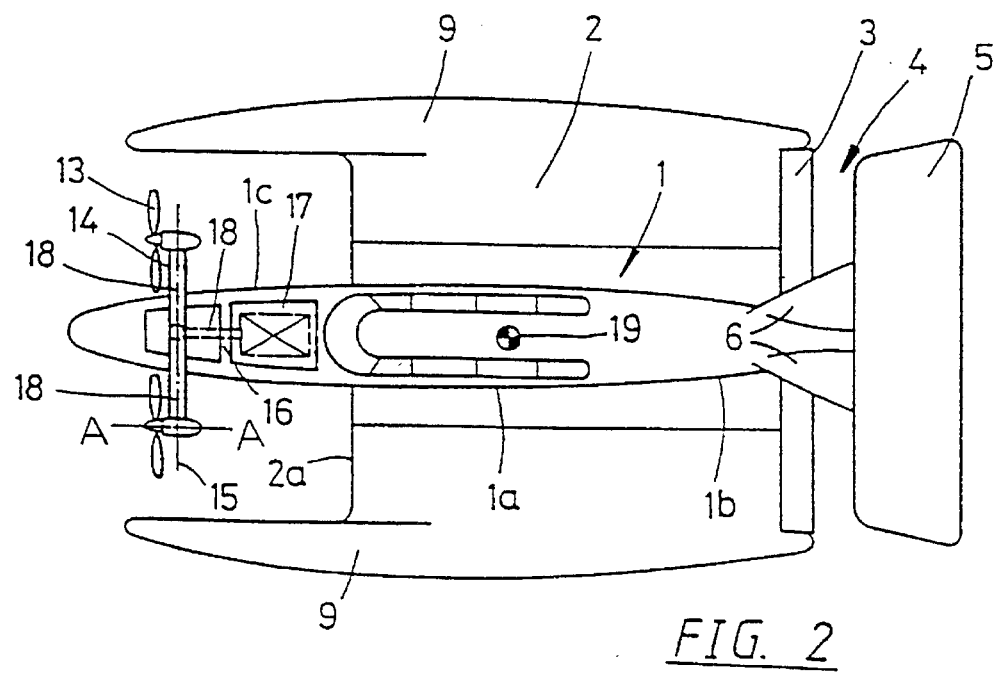
FIG. 2 illustrates schematically the present invention as shown in FIG. 1, but in the plan view.

The plane 13b (shown in FIG. 1) of the disk of the air propeller 13 forms an angle α with the plane 13a of the disk of the air propeller 13 in its initial position corresponding to the positioning of the axis of rotation A—A (shown in FIG. 2) of the propeller 13 in the horizontal plane (shown in FIG. 1). The latter is lying in the vertical plane and varies within the range from about 80° to 0° in the counter-clockwise direction if viewed from the left-hand side of the transport facility. The above-mentioned range within which the disk of the air propeller 13 may have the angular position of its plane varied is related to the change in the speed at which the transport facility is moving, starting from zero and up to the maximum speed in the mode of acceleration. When the angular position of the beam 14 (shown in FIG. 2) is equal to zero, the axis of rotation 2—2 of either propeller 13 lies in the horizontal plane. In this case, the propulsion developed by the propellers 13 has the maximum horizontal constituent, whereby the transport facility is running at its maximum speed.

A drive 16 for rotating the shafts of the air propellers 13 consists of an engine 17 and a mechanical transmission 18. The engine 17 is arranged to be disposed inside the hull 1 and it is located in front of the center 19 of mass in the direction of the bow portion 1c of the hull. The mechanical transmission 18 is arranged to be disposed inside the bow portion 1c of the hull 1 and in the cavity of the beam 14.

The transport facility, according to the present invention, operates as follows:

Prior to starting the movement of the transport facility over water, the end cross-sections of the blades of either propeller 13 (shown in FIG. 1) are to be moved as much as possible away from the water surface, for which purpose the beam 14 (shown in FIG. 2) must have its angular position changed. This leads to a variation in the position of the plane 13b of the disk of either air propeller 13 (shown in FIG. 1) relative to the initial position of this plane, 13a, at which the axis of rotation A—A (shown in FIG. 2) of the propeller 13 lies in the horizontal plane, so that the angle α (shown in FIG. 1) becomes equal to approximately 80°, the angle lying in the vertical plane and determined in the clockwise direction if viewed from the port side of the transport facility. With either air propeller 13 having the plane 13b of its disk in this position, the blades are moved away from the water surface as far as possible. The engine 17 (shown in FIG. 2) is then started and, by means of the mechanical transmission 18, the propellers 13 are set in rotation. After this, the trailing-edge flaps 3 of the wing 2 are lowered. The angular position of the beam 14 is varied so that the angle α decreases to a value at which the air flow created by the propellers is directed beneath the wing 2 to the dome-shaped arch defined by the wing 2 itself, its trailing-edge flaps 3 that are lowered, and by the skegs 9.

Within this arch, the air flow is confined so that, as a result, a lifting force is created which reduces the draught of the transport facility. The latter is brought into motion under the influence of the horizontal constituent of propulsion. The translational movement of the transport facility is going on under the influence of the horizontal constituent of the propulsion developed by the propellers. The transport facility reaches the speed at which the aerodynamic force on the wing becomes equal to the weight of the transport facility so that its take-off from the water surface takes place. In order to increase its speed to the cruising speed, the angular position of the beam is changed again in such a manner that the plane 13a of the disks of the propellers 13 takes its initial position at which the axis of rotation A—A of either propeller lies in the horizontal plane and which corresponds to α=0°, and the propulsion developed by propellers 13 has a maximum horizontal constituent.

In order to shift the transport facility into the mode of braking and landing, the propulsion developed by the propellers should be reduced by decreasing their speed, and the trailing-edge flaps 3 should be lowered. To have the end-cross-sections of the blades of the propellers moved away from water, the angular position of the beam 14 should be varied, as described above, so that either propeller 13 has the plane of its disk take the position corresponding to the position of the plane 13b. There is a reduction in the speed at which the transport facility is moving that takes place under the influence of the force exerted by aerodynamic drag which exceeds the force of propulsion. The transport facility will come into contact with water and get braked because of hydrodynamic drag. For further movement of the transport facility over the shallow water until it comes out of water to the land, the propulsion developed by the propellers should be increased and the propellers should have the planes of their disks change position so that the jet will be directed beneath the wing to build up an air cushion there, as described above. The lifting force developed by this jet will lift the transport facility upwards somewhat, thus reducing the force of friction between the balloons of the skeg and the ground. The movement of the transport facility over the ground is effected under the influence of the horizontal constituent of propulsion.

The transport facility, according to a second embodiment of the present invention, can be operated successfully on the water area in high seas.

Figure 4:
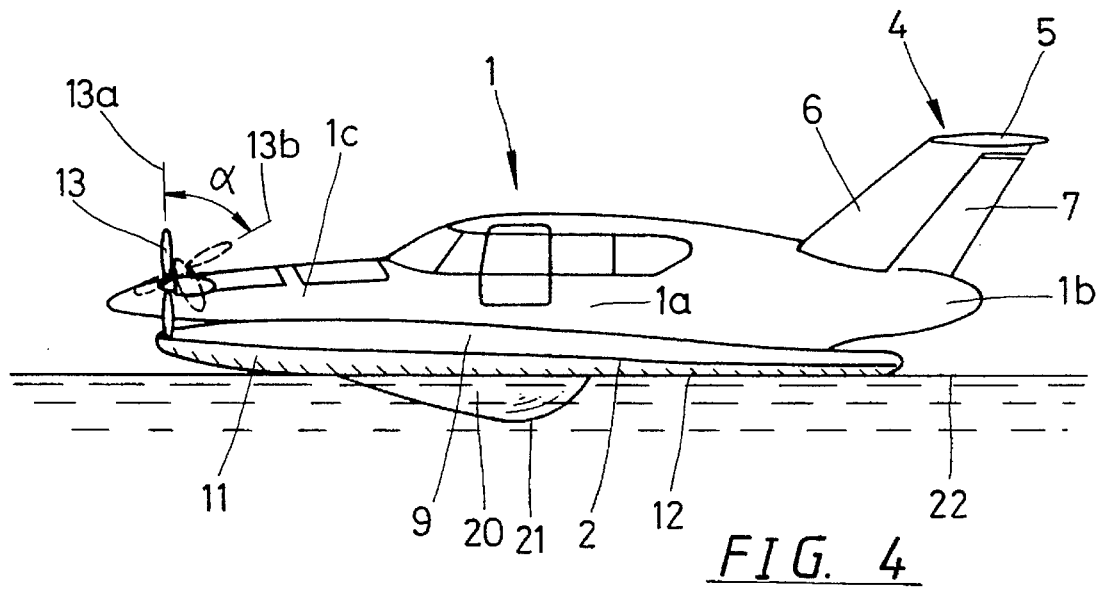
FIG. 4 illustrates schematically a second embodiment of the transport facility, according to the present invention, in its side view.
Figure 5:
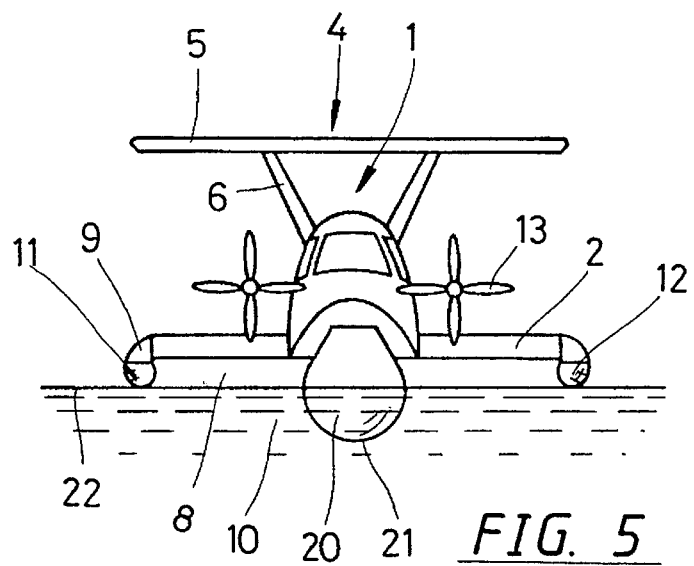
FIG. 5 is the front view of the present invention as shown in FIG. 4.

For this purpose, the design of this transport facility is provided with a self-collapsible, inflatable device 20 (shown in FIGS. 4 and 5). The device 20 is arranged to be disposed on the hull 1 on that side thereof which faces the supporting surface 10. The device stretches from the bow portion 1c of the hull 1 up to approximately the middle portion 1a thereof. When in its unfolded position, the device has cross-sections in the plane of the frames taken successively along its length, which increase their areas. A section of the inflatable device 20 has the surface 21 thereof arranged to be disposed below the horizontal plane 22 that is tangent to the lower surfaces of the pneumatic balloons 11 of the skegs.

The device 20 comprises an inflatable chamber made of an elastic material and connected with an air supercharger (not shown). The above-mentioned device, when in its folded position, is pressed against the hull 1.

The transport facility of the second embodiment operates similarly to that one discussed above. The difference consists in that, in order to move the end cross-sections of the blades of the propellers 13 away from the crests of waves, air can be supplied from a pressure line (not shown) to the chamber of the device 20. The device makes for an additional volume which reduces the draught and increases the trim by the stern of the transport facility. As soon as the transport facility reaches the speed at which the magnitude of hydrodynamic drag is equal to the value of propulsion developed by the air propellers 13, and acceleration becomes equal to zero, the device 20 should be folded down. In its collapsed position, the device is pressed against the hull 1 so that, as a result, the hydrodynamic drag decreases, and the transport facility continues its movement with an acceleration and reaches such a speed at which the aerodynamic force on the wing becomes equal to the weight of the transport facility so that its take-off from the water surface takes place.

In addition to this, the above device 20 improves the maneuverability of the transport facility on the land. Under the influence exerted by the difference of moments emerging from unequal propulsion forces developed by the propeller of the starboard and the propeller of the port side and induced by the driver, the transport facility turns relative to a support provided by the surface 21.

Figure 6:
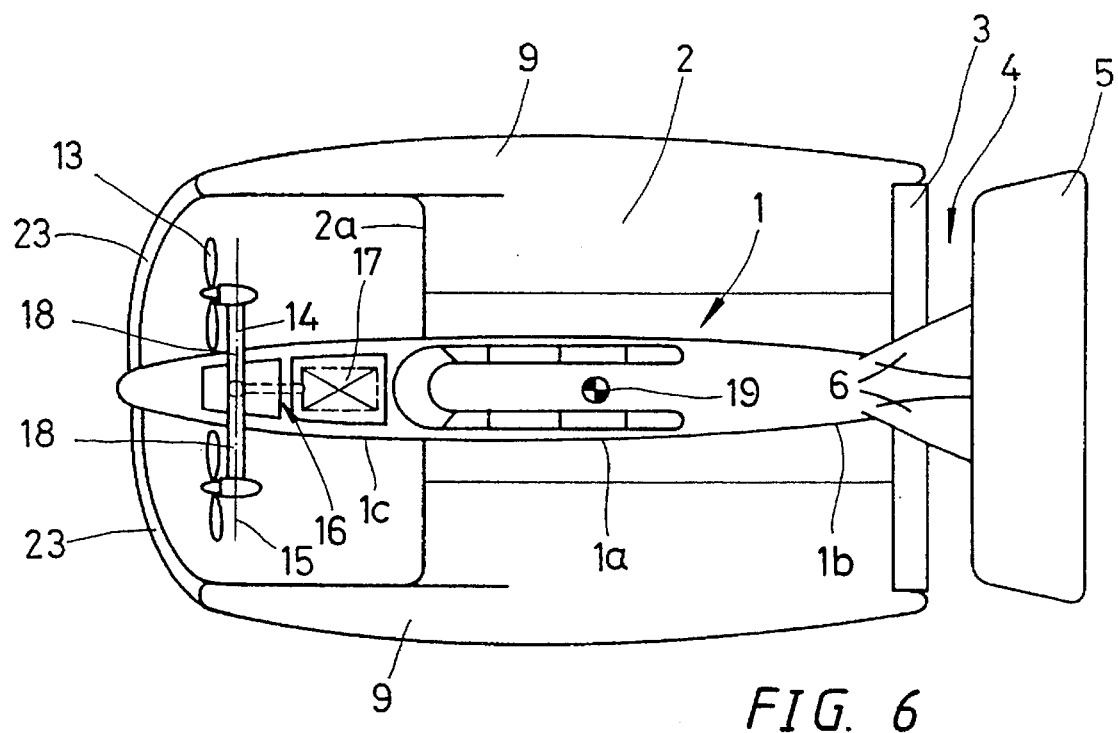
FIG. 6 illustrates schematically a third embodiment of the transport facility, according to the present invention, in its plan view.
Figure 7:
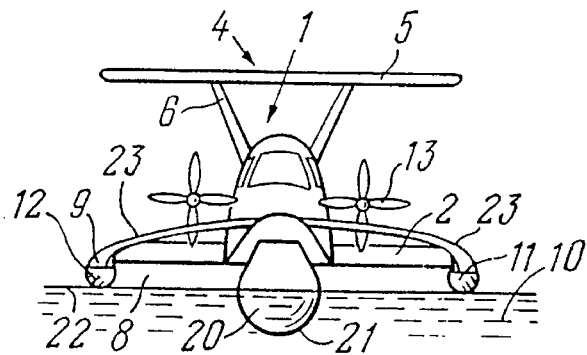
FIG. 7 is the front view of the third embodiment of the present invention as seen in FIG. 6.

A third embodiment of the transport facility with a dynamic cushion, according to the present invention is illustrated in FIGS. 6 and 7.

As far as the design is concerned, this embodiment of the transport facility is similar to those discussed herein above. The difference consists in that there is a means for protecting the propellers 13 against damage when the transport facility runs into objects met along the path of its motion. The protection means comprises two beams 23 either of which is rigidly connected with the bow portion 1c of the hull 1 and with the bow portion of the skeg 9.

This transport facility operates similarly to those discussed above.

Figure 8:
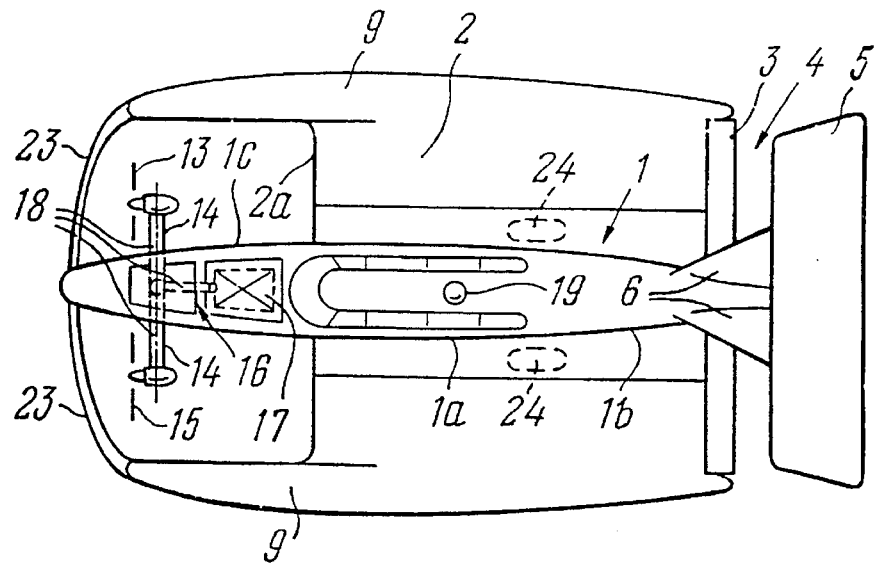
FIG. 8 illustrates schematically a fourth embodiment of the transport facility, according to the present invention, in its plan view.
Figure 9:
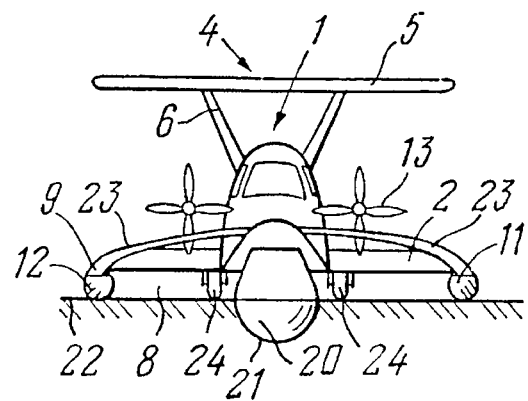
FIG. 9 illustrates schematically the fourth embodiment of the present invention seen in FIG. 8, shown in the front view.

In order to facilitate the transportation of the transport facility over the land, with its engine not running, a further embodiment thereof is illustrated in FIGS. 8 and 9.

As far as the design is concerned, this further embodiment of the transport facility is similar to those discussed above. The difference consists in that the wing 2 (shown in FIG. 8), on the side thereof facing the supporting surface, for instance, the land, is provided with wheeled supports 24 mounted thereto in the immediate vicinity of the hull 1 symmetrically on its starboard and on its port side, the wheeled supports being arranged to be disposed behind the center 19 of the mass of the transport facility in the direction towards the stern thereof. The wheeled supports 24 are connected kinematically with a device (not shown) for extending them outside the wing and for folding them down so that they become housed inside the wing 2.

The transport facility described above operates similarly to those discussed above.

The transport facility, according to the present invention, having an engine power of 230 horse power (h.p.) can carry five passengers to a distance of up to 600 km at a speed of 150 km/hour.

The transport facility, according to the present invention, as described herein above is reliable in operation when the height of waves is up to 0.8 meter and when it comes out of water to a shore or to a bank having an angle of inclination as large as up to 7 degrees.

Thus, although the present invention has been described in relation to particular embodiments thereof, many other variations and modifications and other uses will become apparent to those skilled in the art. The present invention should be limited not by the specific disclosure herein, but only by the appended claims.

We claim:

1. A transport device with a dynamic cushion comprising:

a hull having a bow portion, a middle portion, and a stern portion;

a wing mounted within said middle portion of said hull and having opposing end cross-sections, a bow edge, and trailing-edge flaps for developing a lifting force;

an empennage disposed within said stern portion of said hull;

two skegs for containing an air cushion formed beneath said wing, each said skeg installed at said end cross-sections of said wing, respectively, and joined rigidly with said wing and made resilient on a side of said skegs facing a supporting surface beneath the device;

a hollow beam connected pivotally with and across said hull and provided for varying an angular position of said beam around its longitudinal axis which is perpendicular to a center line plane of said transport device;

means for developing propulsion and made in the form of two air propellers disposed on said pivotal beam, symmetrically with respect to said center line plane of said transport device, and in front of said bow edge of said wing such that a plane of disk of each of one of said air propellers is pivotal with respect to a vertical in a range from about 80° to about 0° in a counterclockwise direction as viewed from a left-hand side of said transport device;

shafts rotating said propellers fastened rigidly to said beam joined with said hull;

an engine connected by means of a mechanical transmission to said shafts for rotating said propellers; and a mechanical transmission disposed inside said hull and in the cavity of said hollow beam.

2. A transport device with a dynamic cushion as claimed in claim 1, wherein said hull, on one side thereof facing said supporting surface, has a self-collapsible, inflatable device stretching from said bow portion for said hull to approximately said middle portion thereof, and having a surface arranged to be disposed below a horizontal plane that is tangent to lower surfaces of said skegs.

3. A transport device with a dynamic cushion as claimed in claim 1, wherein said transport device is provided with means for protecting said propellers against damage, said means comprising two beams, each said beam is rigidly connected with said bow portion of said hull and said skeg.

4. A transport device with a dynamic cushion as claimed in claim 1, wherein said wing, on the side thereof facing said supporting surface, is provided with wheeled supports mounted thereto in vicinity to said hull on starboard and on port side thereof, said wheeled supports being arranged to be disposed behind said center of mass of said transport device in a direction toward a stern thereof, whereas said wheeled supports are connected for extending them outside said wing and for folding inside said wing.

5. A transport facility having a dynamic air cushion comprising:

a hull having a bow part, a middlebody, and a stern part;

an airfoil installed in said middlebody of said hull and having a small aspect ratio, with opposing outer tip sections, a leading edge, and a trailing edge with rear flaps for creating a lift force;

an empennage designed to impart stability to said transport facility, disposed in said stern part of said hull;

two skegs to provide said transport facility with buoyancy on water and bearing support on land, each of said two skegs being installed in the outer tip section of said airfoil, connected rigidly with the latter and being flexible at a bottom side for facing either land or water;

a hollow beam disposed on said bow part of said hull so it can be articulated with respect to said bow part of said hull;

two supports, each being rigidly secured to said beam;

two rotary shafts, each being installed in one of said two supports;

two air propellers to build up thrust, arranged symmetrically, with the diametral plane of each of said two propellers being in front of said leading edge of said airfoil, each of said two propellers being secured on one of said two rotary shafts supported on said beam, the angular position of said beam relative to its axial vertical plane perpendicular to the axial vertical plane of said transport facility being changeable such that the plane of the disc of each one of said two propellers forms an angle $\alpha$ of from about 80° to about 0° with the plane of the disc of the same propeller in its initial position corresponding to the position of the propeller axis of rotation in a horizontal plane, taken in a counterclockwise direction, viewing from the port side of said transport facility while in case of a zero angular position of said beam the axis of rotation of each of said two propellers lies in a horizontal plane;

an engine secured in said hull and disposed in front of the center of mass of said transport facility in the direction towards said bow part of the hull;

a mechanical transmission accommodated in said hull and inside of said beam and kinematically linked with said engine and said two rotary shafts; and a self-unfolding inflatable device arranged on said hull at the side for facing land or water, extending from said bow part of said hull approximately to its said middle-body and having its cross sections in the unfolded position gradually increasing in a vertical direction forming a pear-shaped body, with a part of its surface in the suspended position of said transport facility being located below a plane including said bottom sides of said skegs.

6. The transport facility according to claim 5, further comprising:

a bow part of each of said two skegs; and means for protection of said two propellers against damage including two beams, each beam being rigidly secured to said bow part of said hull and said bow part of each of said two skegs, and positioned at a distance from the plane of disc of each of said two propellers in the direction of movement of the transport facility.

7. The transport facility according to claim 6, further comprising:

at least two wheeled supports each installed on said airfoil at the side for facing the land or water and in close proximity to said hull on the starboard and port sides, respectively, behind the center of mass of said transport facility in the direction towards its said stern part; and axles of said at least two wheeled supports; said at least two wheeled supports can be articulated with respect to the airfoil for extension and retraction of the wheeled supports.

8. The transport facility according to claim 5, further comprising:

at least two wheeled supports, each installed on said airfoil at the side for facing the land or water and in close proximity to said hull on the starboard and port sides respectively behind the center of mass of said transport facility in the direction towards its stern part; and axles holding said at least two wheeled supports;

wherein said at least two wheeled supports are articulatedly disposed on the airfoil for extension and retraction of the wheeled supports.

* * * * *